US011386078B2

(12) United States Patent
Schreter

(10) Patent No.: US 11,386,078 B2
(45) Date of Patent: Jul. 12, 2022

(54) DISTRIBUTED TRUST DATA STORAGE SYSTEM

(71) Applicant: SAP SE, Walldorf (DE)

(72) Inventor: Ivan Schreter, Malsch (DE)

(73) Assignee: SAP SE, Walldorf (DE)

(*) Notice: Subject to any disclaimer, the term of this patent is extended or adjusted under 35 U.S.C. 154(b) by 242 days.

(21) Appl. No.: 16/222,931

(22) Filed: Dec. 17, 2018

(65) Prior Publication Data
US 2020/0192888 A1 Jun. 18, 2020

(51) Int. Cl.
G06F 16/27 (2019.01)
G06F 16/23 (2019.01)
G06F 3/06 (2006.01)
H04L 9/06 (2006.01)

(52) U.S. Cl.
CPC ........ *G06F 16/2379* (2019.01); *G06F 3/0619* (2013.01); *G06F 3/0623* (2013.01); *G06F 3/0644* (2013.01); *G06F 3/0659* (2013.01); *G06F 3/0673* (2013.01); *G06F 16/27* (2019.01); *H04L 9/0643* (2013.01); *G06F 16/2365* (2019.01)

(58) Field of Classification Search
CPC .... G06F 16/2379; G06F 16/27; G06F 3/0619; G06F 3/0623; G06F 3/0644; G06F 3/0659; G06F 3/0673; G06F 16/2365; G06F 16/2255; H04L 9/0643
USPC ........................................................ 707/703
See application file for complete search history.

(56) References Cited

U.S. PATENT DOCUMENTS

| | | | | |
|---|---|---|---|---|
| 5,878,431 A | * | 3/1999 | Potterveld | G06F 9/465 707/694 |
| 7,849,223 B2 | | 12/2010 | Malkhi et al. | |
| 8,032,498 B1 | * | 10/2011 | Armangau | G06F 16/128 707/690 |
| 9,800,517 B1 | * | 10/2017 | Anderson | H04L 47/70 |
| 9,875,510 B1 | * | 1/2018 | Kasper | H04L 67/104 |
| 10,200,197 B1 | * | 2/2019 | Li | H04L 9/008 |
| 10,348,817 B2 | * | 7/2019 | Schreter | H04L 67/1095 |
| 10,552,069 B2 | * | 2/2020 | Schreter | G06F 3/0659 |
| 10,579,974 B1 | * | 3/2020 | Reed | G06Q 20/065 |
| 10,788,998 B2 | * | 9/2020 | Schreter | G06F 12/0802 |
| 10,868,673 B2 | * | 12/2020 | Mahanta | H04L 9/0637 |

(Continued)

*Primary Examiner* — Ashish Thomas
*Assistant Examiner* — Nargis Sultana
(74) *Attorney, Agent, or Firm* — Mintz Levin Cohn Ferris Glovsky and Popeo, P.C.

(57) ABSTRACT

A method can include receiving, at a node comprising a distributed trust data storage system, a request to execute a transaction modifying a portion of a data partition. Replicas of the data partition may be stored at a plurality of nodes comprising the distributed trust data storage system. In response to the request, the transaction can be sent to the plurality of nodes storing replicas of the data partition to modify the portion of the data partition. The transaction can be committed based on a threshold quantity of the plurality of nodes reaching a consensus by determining a same cryptographic hash for the transaction. The transaction can be committed by sending, to the plurality of nodes, an indication to add an entry corresponding to the transaction to a transaction log recording transactions executed on the portion of the data partition. Related systems and articles of manufacture are also provided.

14 Claims, 6 Drawing Sheets

(56) References Cited

U.S. PATENT DOCUMENTS

| | | | |
|---|---|---|---|
| 2009/0150566 A1* | 6/2009 | Malkhi | H04L 67/34 |
| | | | 709/242 |
| 2010/0293140 A1* | 11/2010 | Nishiyama | G06F 16/27 |
| | | | 707/636 |
| 2014/0289358 A1* | 9/2014 | Lindamood | G06F 11/2094 |
| | | | 709/214 |
| 2014/0298034 A1* | 10/2014 | Watanabe | H04L 9/3236 |
| | | | 713/176 |
| 2015/0254264 A1* | 9/2015 | Yu | G06F 16/137 |
| | | | 707/674 |
| 2016/0105471 A1 | 4/2016 | Nunes et al. | |
| 2016/0308968 A1 | 10/2016 | Friedman | |
| 2017/0124169 A1* | 5/2017 | Ullrich | G06F 16/27 |
| 2017/0295061 A1* | 10/2017 | Wittenschlaeger | H04L 45/00 |
| 2017/0364273 A1* | 12/2017 | Schreter | G06F 3/0619 |
| 2017/0364698 A1* | 12/2017 | Goldfarb | G06F 16/9014 |
| 2017/0364700 A1* | 12/2017 | Goldfarb | G06F 21/6218 |
| 2017/0366353 A1* | 12/2017 | Struttmann | G06F 21/64 |
| 2018/0139278 A1* | 5/2018 | Bathen | H04L 9/3247 |
| 2018/0150230 A1* | 5/2018 | Schreter | G06F 11/2097 |
| 2018/0165476 A1* | 6/2018 | Carey | G06F 21/577 |
| 2018/0335955 A1* | 11/2018 | Schreter | G06F 13/1642 |
| 2019/0081793 A1* | 3/2019 | Martino | G06Q 20/065 |
| 2019/0179939 A1* | 6/2019 | Govindarajan | G06F 11/1474 |
| 2019/0199515 A1* | 6/2019 | Carver | H04L 9/0643 |
| 2019/0258991 A1* | 8/2019 | Nguyen | G06F 16/182 |
| 2020/0050386 A1* | 2/2020 | Natarajan | G06F 3/0644 |
| 2020/0160336 A1* | 5/2020 | Li | G06Q 20/38215 |
| 2020/0169412 A1* | 5/2020 | Certain | H04L 9/3236 |
| 2020/0186355 A1* | 6/2020 | Davies | H04L 9/3247 |

\* cited by examiner

DISTRIBUTED TRUST DATA STORAGE SYSTEM

TECHNICAL FIELD

The subject matter described herein relates generally to distributed computing and more specifically to logging transactions in a distributed data storage system.

BACKGROUND

A distributed data storage system can store data across multiple computing nodes. These computing nodes can be located across different racks, availability zones, and/or data centers in the distributed data storage system. Furthermore, the distributed data storage system can be configured to store data from multiple tenants. Data from each individual tenant can be organized into one or more data partitions and stored in at least one data container. Moreover, each data partition can be stored in one of the computing nodes in the distributed data storage system. As such, locating data within the distributed data storage system, for example, in order to respond to a query (e.g., a structured query language (SQL) statement and/or the like), can require identifying the data partition and/or the data container holding the data. Alternatively and/or additionally, locating data within the distributed data storage system can require identifying the data center, availability zone, rack, and/or computing node storing the data.

SUMMARY

Systems, methods, and articles of manufacture, including computer program products, are provided for a distributed trust data storage system. In one aspect, there is provided a system. The system may include at least one data processor and at least one memory. The at least one memory may store instructions that result in operations when executed by the at least one data processor. The operations may include: receiving, at a node comprising a distributed trust data storage system, a request from a client to execute a first transaction modifying at least a portion of a first data partition, replicas of the first data partition being stored at a plurality of nodes comprising the distributed trust data storage system; responding to the request by at least sending, to the plurality of nodes storing replicas of the first data partition, the first transaction to modify at least the portion of the first data partition; and committing the first transaction based at least on a threshold quantity of the plurality of nodes reaching a consensus by determining a same cryptographic hash for the first transaction, the first transaction being committed by at least sending, to the plurality of nodes, an indication to add a first entry corresponding to the first transaction to a transaction log recording one or more transactions executed on at least the portion of the first data partition.

In some variations, one or more features disclosed herein including the following features can optionally be included in any feasible combination. The cryptographic hash of the first transaction may be determined based at least on the first transaction.

In some variations, the cryptographic hash of the first transaction may be further determined based on a cryptographic hash of at least a second transaction. The second transaction may be a previous transaction modifying a same data record from the first data partition as the first transaction. The entry corresponding to the first transaction may include a globally unique identifier associated with the first transaction and the cryptographic hash of at least the second transaction. The transaction log may further include a second entry corresponding to the second transaction. The second entry may include a globally unique identifier associated with the second transaction and a cryptographic hash of at least a third transaction preceding the second transaction and modifying a same data record as the second transaction.

In some variations, the first transaction may further modify at least a portion of a second data partition. The first transaction may be further committed by at least adding the first entry to another transaction log recording one or more transactions executed on at least the portion of the second data partition. At least one of the plurality of nodes may store a replica of the first data partition and a replica of the second data partition. None of the plurality of nodes may store more than one replica of a same data partition. The transaction log and the other transaction log may be interlinked by a mesh of transactions including the first transaction and a second transaction that modify a same data record from the first data partition and/or the second data partition as the first transaction.

In some variations, in response to another request from the client to read the first data partition, at least a portion of the plurality of nodes storing the first data partition may be queried. The portion of the plurality of nodes may be queried to at least retrieve one or more entries from the transaction log recording the one or more transactions executed on at least the portion of the first data partition. The one or more entries retrieved from the plurality of nodes may be returned to the client to at least enable a detection of a forged transaction. The forged transaction may be detected based at least on a mismatch between a first entry retrieved from a first node storing a first replica of the first data partition and a second entry received from a second node storing a second replica of the first data partition.

In some variations, in response to the detecting the forged transaction, a remaining portion of the plurality of nodes storing the first data partition may be queried to at least retrieve the one or more entries from the transaction log recording the one or more transactions executed on at least the portion of the first data partition. In response to a match in the one or more entries of the transaction log retrieved from a quorum of the remaining portion of the plurality of nodes, the response to the other request may be determined based on the one or more entries of the transaction log retrieved from the remaining portion of the plurality of nodes.

In some variations, the one or more entries retrieved from the plurality of nodes may include the first entry corresponding to the first transaction and a third entry corresponding to a second transaction preceding the first transaction. The forged operation may be further detected based at least on a mismatch in a hash value of the second transaction stored in a key-value pair associated with the first transaction and an actual hash of the second transaction. A key of the key-value pair may include the globally unique identifier of the second transaction. A value of the key-value pair may include a cryptographic hash of at least a portion of the second entry corresponding to the second transaction.

In another aspect, a method is provided for a distributed trust data storage system. The method may include: receiving, at a node comprising a distributed trust data storage system, a request from a client to execute a first transaction modifying at least a portion of a first data partition, replicas of the first data partition being stored at a plurality of nodes comprising the distributed trust data storage system;

responding to the request by at least sending, to the plurality of nodes storing replicas of the first data partition, the first transaction to modify at least the portion of the first data partition; and committing the first transaction based at least on a threshold quantity of the plurality of nodes reaching a consensus by determining a same cryptographic hash for the first transaction, the first transaction being committed by at least sending, to the plurality of nodes, an indication to add a first entry corresponding to the first transaction to a transaction log recording one or more transactions executed on at least the portion of the first data partition.

In some variations, one or more features disclosed herein including the following features can optionally be included in any feasible combination. The cryptographic hash of the first transaction may be determined based at least on the first transaction.

In some variations, the cryptographic hash of the first transaction may be further determined based on a cryptographic hash of at least a second transaction. The second transaction may be a previous transaction modifying a same data record from the first data partition as the first transaction. The entry corresponding to the first transaction may include a globally unique identifier associated with the first transaction and the cryptographic hash of at least the second transaction. The transaction log may further include a second entry corresponding to the second transaction. The second entry may include a globally unique identifier associated with the second transaction and a cryptographic hash of at least a third transaction preceding the second transaction and modifying a same data record as the second transaction.

In some variations, the first transaction may further modify at least a portion of a second data partition. The first transaction may be further committed by at least adding the first entry to another transaction log recording one or more transactions executed on at least the portion of the second data partition. At least one of the plurality of nodes may store a replica of the first data partition and a replica of the second data partition. None of the plurality of nodes may store more than one replica of a same data partition. The transaction log and the other transaction log may be interlinked by a mesh of transactions including the first transaction and a second transaction that modify a same data record from the first data partition and/or the second data partition as the first transaction.

In some variations, the method may further include: responding to another request from the client to read the first data partition by querying at least a portion of the plurality of nodes storing the first data partition, the portion of the plurality of nodes being queried to at least retrieve one or more entries from the transaction log recording the one or more transactions executed on at least the portion of the first data partition; detecting a forged transaction based at least on a mismatch between a first entry retrieved from a first node storing a first replica of the first data partition and a second entry received from a second node storing a second replica of the first data partition; in response to detecting the forged transaction, querying a remaining portion of the plurality of nodes storing the first data partition to at least retrieve the one or more entries from the transaction log recording the one or more transactions executed on at least the portion of the first data partition; and in response to a match in the one or more entries of the transaction log retrieved from a quorum of the remaining portion of the plurality of nodes, responding to the other request based on the one or more entries of the transaction log retrieved from the remaining portion of the plurality of nodes.

In some variations, the one or more entries retrieved from the plurality of nodes may include the first entry corresponding to the first transaction and a third entry corresponding to a second transaction preceding the first transaction. The forged operation may be further detected based at least on a mismatch in a hash value of the second transaction stored in a key-value pair associated with the first transaction and an actual hash of the second transaction. A key of the key-value pair may include the globally unique identifier of the second transaction. A value of the key-value pair may include a cryptographic hash of at least a portion of the second entry corresponding to the second transaction.

In another aspect, a computer program product is provided for a distributed trust data storage system. The computer program product may include a non-transitory computer readable medium storing instructions that cause operations when executed by at least one data processor. The operations may include: receiving, at a node comprising a distributed trust data storage system, a request from a client to execute a first transaction modifying at least a portion of a first data partition, replicas of the first data partition being stored at a plurality of nodes comprising the distributed trust data storage system; responding to the request by at least sending, to the plurality of nodes storing replicas of the first data partition, the first transaction to modify at least the portion of the first data partition; and committing the first transaction based at least on a threshold quantity of the plurality of nodes reaching a consensus by determining a same cryptographic hash for the first transaction, the first transaction being committed by at least sending, to the plurality of nodes, an indication to add a first entry corresponding to the first transaction to a transaction log recording one or more transactions executed on at least the portion of the first data partition.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
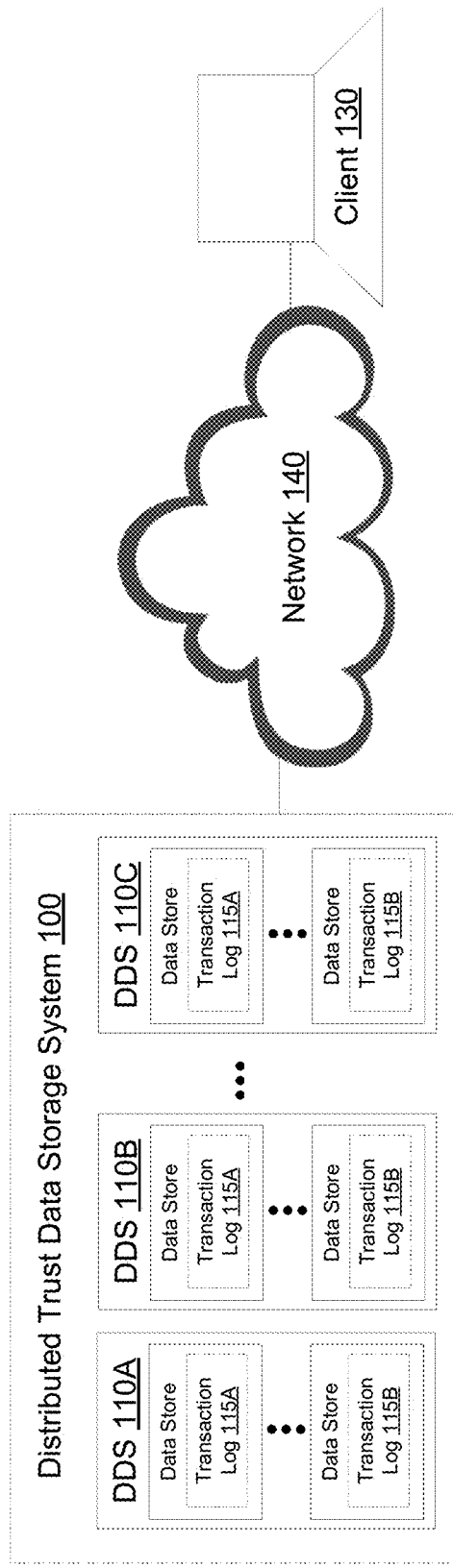
FIG. 1 depicts a system diagram illustrating a distributed data storage system consistent with some implementations of the current subject matter.

A distributed trust data storage system can store data across a plurality of distributed data storage systems. For example, a data container holding an organized collection of data objects can be divided into one or more data partitions. Furthermore, each data partition can be replicated multiple times and a replica of each data partition can be stored at a distributed data storing system having one or more individual computing nodes. Consistency across the replicas of a single data partition can be maintained based on a state machine at each distributed data storage system. Each state machine may operate in accordance to a consensus protocol. For instance, a client of the distributed trust data storage system can request to execute a transaction, which may require the performance of one or more operations causing changes to data records held in one or more different data partitions. These changes to the one or more data partition can be propagated to replicas of the same data partitions stored at various computing nodes within different distributed data storage systems across the distributed trust data storage system. The state machine at each of the affected distributed data storage systems can undergo one or more corresponding state transitions if the changes to the data partitions are successfully propagated to a threshold quantity of computing nodes at each distributed data storage system storing replicas of the data partitions.

In some implementations of the current subject matter, each replica of a data partition can include one or more snapshots of a state machine. A snapshot of the state machine can be created at a checkpoint and can therefore capture a state of the data partition at that checkpoint. Furthermore, each replica of the data partition can include a replica of a transaction log for recording transactions executed on data records in the data partition subsequent to the checkpoint. As used herein, a transaction may include one or more operations, each of which being performed on a different data record from the same data partition and/or a different data partition. That is, a single transaction can affect multiple data partitions, the replicas of which being stored across a plurality distributed data storage systems. Thus, according to some implementations of the current subject matter, a transaction affecting multiple data partitions can be added as a log entry to the transaction logs of these data partitions if the transaction is confirmed by a threshold quantity of the distributed data storage systems storing replicas of every data partition affected by the transaction. Moreover, a log entry in the transaction log of one data partition can store the hashes of every previous transaction that affected the same data records, including data records from other data partitions, thereby creating an interlinked and immutable mesh of transactions in the transaction logs stored across the distributed trust data storage system.

In some implementations of the current subject matter, the sequence of transactions stored in every transaction log across all data partitions can be immune to modifications, as the transaction logs can be built as a cryptographically secured mesh of cross-linked transactions. Notably, this sequence of transactions may be immutable over all data and is linked to form a mesh of transactions that is resistant to malicious attacks. Furthermore, in the event of a crash at any computing node and/or distributed data storage system storing a replica of the data partition, the transactions recorded in the transaction logs can be replayed on a snapshot of the corresponding state machine created prior to the crash to restore the replica of the data partition to the state prior to the crash.

In some implementations of the current subject matter, replicas of a data partition can be represented as collections of key-value pairs held in key-value stores at various computing nodes in various distributed data storage systems across the distributed trust data storage system. For example, each individual data record in a data partition can be associated with a key in a key-value pair. As such, the execution of a transaction, which can include performing one or more corresponding operations on data records from at least one data partition, can modify the value in the key-value pairs representative of the data records.

In some implementations of the current subject matter, a log entry can be generated in response to the execution of a transaction which, as noted, can affect multiple data partitions by at least modifying data records from different data partitions. The log entry can include a cryptographic hash determined based on the current transaction that is being executed as well as one or more previous transactions affecting the same data records. Because a single transaction can modify data records from multiple data partitions, a corresponding log entry can be added to the transaction logs of multiple data partitions, thereby interlinking the transaction logs of these data partitions. According to some example embodiments, the log entry corresponding to a transaction can be added to the transaction logs held at the distributed data storage systems storing replicas of every data partition affected by the transaction if a threshold quantity of these distributed data storage systems are able to reach a consensus by at least determining a same cryptographic hash. It should be appreciated that by logging transactions that affect data records from different data partitions, the state of an individual data partition can be tracked by multiple distributed data storage systems, including those storing replicas of different data partitions. For example, a chain of transactions affecting a data partition, for example, by modifying data records within that data partition, can be determined by at least traversing the transaction logs at every distributed data storage system within the distributed trust data storage system.

FIG. 1 depicts a system diagram illustrating a distributed trust data storage system 100 consistent with implementations of the current subject matter as present at each participant of the distributed trust. Referring to FIG. 1, the distributed trust data storage system 100 can include a plurality of distributed data storage systems including, for example, a first distributed data storage system 110A, a second distributed data storage system 110B, a third distributed data storage system 110C, and/or the like. Furthermore, as shown in FIG. 1, the distributed trust data storage system 100 can be communicatively coupled, via a network 140, with one or more clients including, for example, a client 130. The network 140 can be any wired and/or wireless network including, for example, a public land mobile network (PLMN), a local area network (LAN), a virtual local area network (VLAN), a wide area network (WAN), the Internet, and/or the like. Meanwhile, the client 130 can be any processor-based device including, for example, a mobile device, a wearable device, a tablet computer, a desktop computer, a laptop computer, and/or the like.

Figure 2:
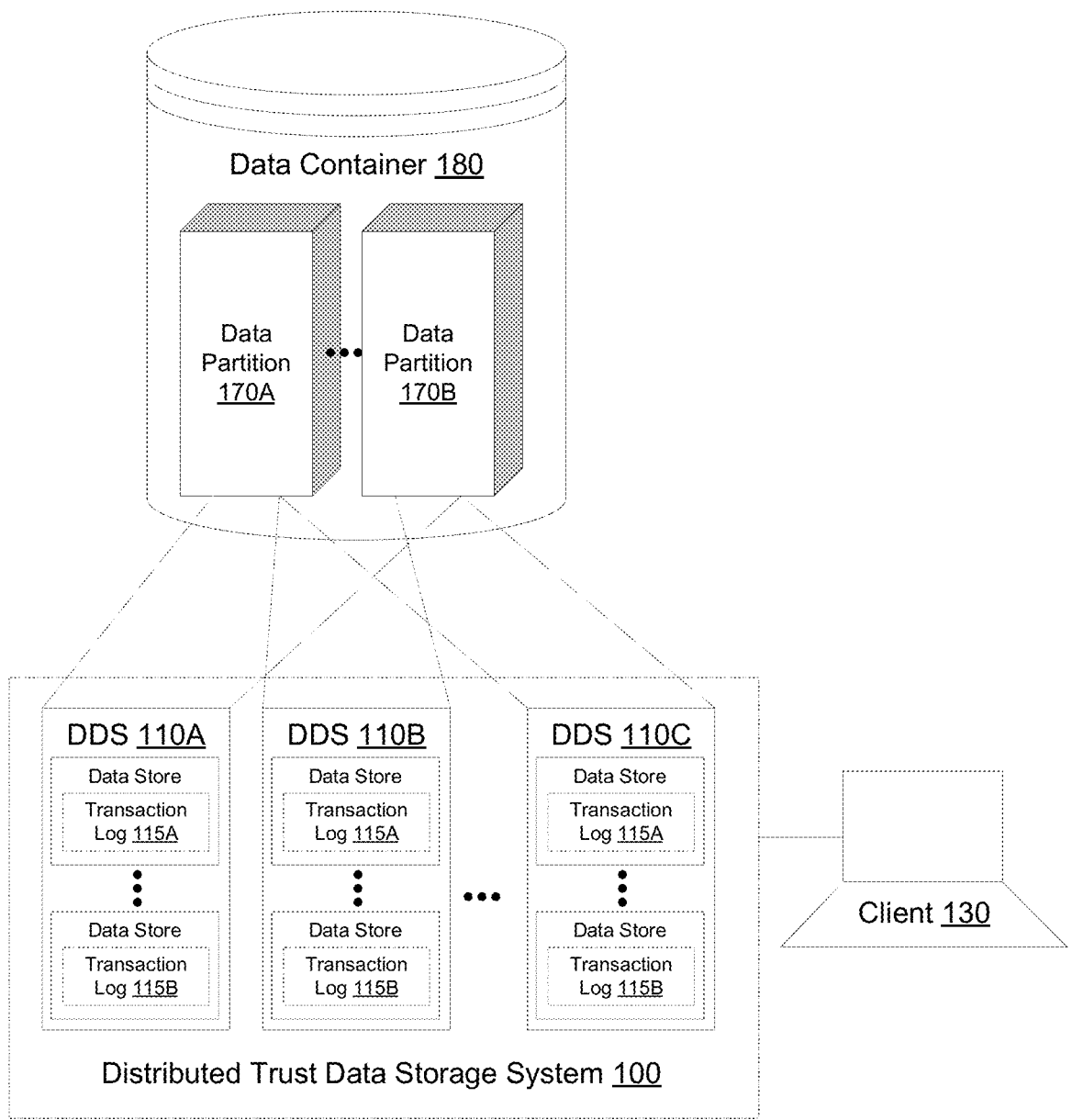
FIG. 2 depicts replicas of a data partition being stored in a portion of a distributed data storage system consistent with some implementations of the current subject matter.

In some implementations of the current subject matter, the distributed trust data storage system 100 can be configured to store one or more data containers, each of which holding an organized collection of data objects. A data container can be divided into one or more data partitions, for example, based on a partition key that includes a placement prefix and a cryptographic hash of a data key. As such, data from the data container can be placed across the distributed trust data storage system 100 in a pseudo-random manner. Furthermore, each data partition can be replicated multiple times and a replica of each data partition can be stored at multiple computing nodes within an individual distributed data storage system, such as, for example, the first distributed data storage system 110A, the second distributed data storage system 110B, and/or the third distributed data storage system 110C. For instance, FIG. 2 depicts replicas of a data partition being stored in a portion of the distributed trust data storage system 100. As shown in FIG. 2, a data container 180 can be divided into a plurality of data partitions including, for example, a first data partition 170A, a second data partition 170B, and/or the like. The first data partition 170A and/or the second data partition 170B can each be replicated a k quantity of times and each of the k quantity of replicas can be stored at one of a k quantity of distributed data storage systems within the distributed trust data storage system 100. For example, as shown in FIG. 2, the first distributed data storage system 110A and/or the second distributed data storage system 110B can each store a single replica of the first data partition 170A while the third distributed data storage system 110C can store at least one replica of the second data partition 170B.

Although FIG. 1 shows the distributed trust data storage system 100 as including multiple distributed data storage systems that each include one or more clusters of computing nodes, it should be appreciated that the distributed trust data storage system 100 can also be formed from individual computing nodes. Furthermore, it should be appreciated that a single entity within the distributed trust data storage system 100 (e.g., the first distributed data storage system 110A, the second distributed data storage system 110B, the third distributed data storage system 110C, and/or the like) can store no more than a single replica of a data partition. Accordingly, each of the k quantity of replicas of the first data partition 170A and/or the second partition 170B can be stored at and/or managed by a different entity, thereby preventing a single entity from assuming control over an entire data partition. Moreover, in some implementations of the current subject matter, the placement of data records across different data partitions can be performed based on the partition key assigned to each data record. The partition key associated with a data record can be formed by concatenating a placement prefix and a cryptographic hash of the data key associated with the data record. While the placement prefix portion of the partition key can ensure that the data record is placed at a specific location (e.g., a distributed data storage system located in a certain jurisdiction), the cryptographic hash portion of the partition can preserve the pseudo-random nature of the placement.

In some implementations of the current subject matter, each replica of the first data partition 170A can include one or more snapshots of a state machine configured to track changes to the first data partition 170A. Similarly, each replica of the second data partition 170B can also include one or more snapshots of a state machine configured to track changes to the second data partition 170B. A snapshot of the corresponding state machine can be created at a checkpoint to capture a state of the first data partition 170A and/or the second data partition 170B at that checkpoint. Furthermore, each replica of the data partition can include one or more transaction logs for recording operations performed on the first data partition 170A and/or the second data partition 170B subsequent to the checkpoint.

Each replica of a data partition can be stored at a different distributed data storage system. Meanwhile, multiple replicas of the same data partition can be prevented from being stored at a single distributed data storage system. For example, as shown in FIGS. 1-2, a first replica of the first data partition 170A can be stored at the first distributed data storage system 110A, a second replica of the first data partition 170A can be stored at the second distributed data storage system 110B, and a third replica of the first data partition 170A can be stored at the third distributed data storage system 110C. As such, replicas of a first transaction log 115A, which records record transactions affecting at least the first data partition 170A, can be stored across the first distributed data storage system 110A, the second distributed data storage system 110B, and the third distributed data storage system 110C, for example, at different data stores within the first distributed data storage system 110A, the second distributed data storage system 110B, and the third distributed data storage system 110C.

Alternatively and/or additionally, a single replica of the second data partition 170B can also be stored at the first distributed data storage system 110A, the second distributed data storage system 110B, and/or the third distributed data storage system 110C. For instance, FIGS. 1-2 shows replicas of a second transaction log 115B recording transactions that affect at least the second data partition 170B as being stored at different data stores across the first distributed data storage system 110A, the second distributed data storage system 110B, and the third distributed data storage system 110C.

In some implementations of the current subject matter, data records from the first data partition 170A and/or the second data partition 170B can be stored as key-value pairs in a key-value store. For example, as shown in FIGS. 1-2, the first distributed data storage system 110A, the second distributed data storage system 110B, and/or the third distributed data storage system 110C can each include multiple data stores. These data stores can each be a key-value store configured to store data records in the form of one or more key-value pairs (KVPs). For instance, the data stores forming the first distributed data storage system 110A, the second distributed data storage system 110B, and/or the third distributed data storage system 110C can each be a hybrid key-value store in which data records that do not exceed a threshold size (e.g., 2 kilobytes and/or a different size) are stored in an in-memory key-value store and data records that do exceed the threshold size (e.g., 2 kilobytes and/or a different size) are stored in a secondary data store. It should be appreciated that an in-memory key-value store can be implemented using any type of persistence that supports low latency access including, for example, random access memory (RAM) and/or the like. Meanwhile, the secondary data store can be implemented using any type of persistence that supports high capacity storage including, for example, hard disk and/or the like.

As noted, the first transaction log 115A can record transactions affecting at least the first data partition 170A, for example, by modifying data records from the first data partition 170A. Meanwhile, the second transaction log 115B can record transactions affecting at least the second data partition 170B, for example, by modifying data records from the second data partition 170B. According to some implementations of the current subject matter, the first transaction log 115A and/or the second transaction log 115B can each be stored as a page list in the data stores within first distributed data storage system 110A, the second distributed data storage system 110B, and/or the third distributed data storage system 110C. It should be appreciated that the first data partition 170A and/or the second data partition 170B can be associated with additional transaction logs. For instance, the first transaction log 115A and/or the second transaction log 115B can record transactions affecting only a portion of the corresponding data partition. As such, the transaction logs recording transactions performed on other portions of the first data partition 170A and/or the second data partition 170B can be stored as different page lists in the first distributed data storage system 110A, the second distributed data storage system 110B, and/or the third distributed data storage system 110C.

In some implementations of the current subject matter, the first transaction log 115A can store an immutable sequence of transactions that affect at least the first data partition 170A, for example, by modifying data records from the first data partition 170A. Meanwhile, the second transaction log 115B can store an immutable sequence of transactions that affect at least the second data partition 170B, for example, by modifying data records from the second data partition 170B. As noted, a single transaction can include multiple operations, each of which modifying a data record from a same data partition and/or a different data partition. For instance, the distributed trust data storage system 100 can receive, from the client 130, a request to execute a transaction that includes a first operation that modifies a first data record from the first data partition 170A and a second operation that modifies a second data record from the second data partition 170B. Accordingly, that transaction can be recorded as part of a log entry in the first transaction log 115A and the second transaction log 115B.

In some implementations of the current subject matter, the first transaction log 115A and the second transaction log 115B can each include one or more log entries. Each log entry can include a cryptographic hash determined based on a current transaction as well as one or more previous transactions that modify the same data records. Furthermore, a log entry can be added to the first transaction log 115A and/or the second transaction log 115B if a threshold quantity of the distributed data storage systems storing replicas of the data partitions affected by the corresponding transaction are able to reach a consensus, for example, by determining a same cryptographic hash for the transaction. In the previous example, the distributed trust data storage system 100 is responding to a request to execute a transaction that affects the first data partition 170A and the second data partition 170B. A log entry corresponding to that transaction can be added to the first transaction log 115A and the second transaction log 115B if a $$\frac{k}{2}$$

quantity (or a different threshold quantity) of the distributed data storage system storing replicas of the first data partition 170A and the second data partition 170B (e.g., the first distributed data storage system 110A, the second distributed data storage system 110B, the third distributed data storage system 110C, and/or the like) determine a same cryptographic hash for that transaction.

Figure 3:
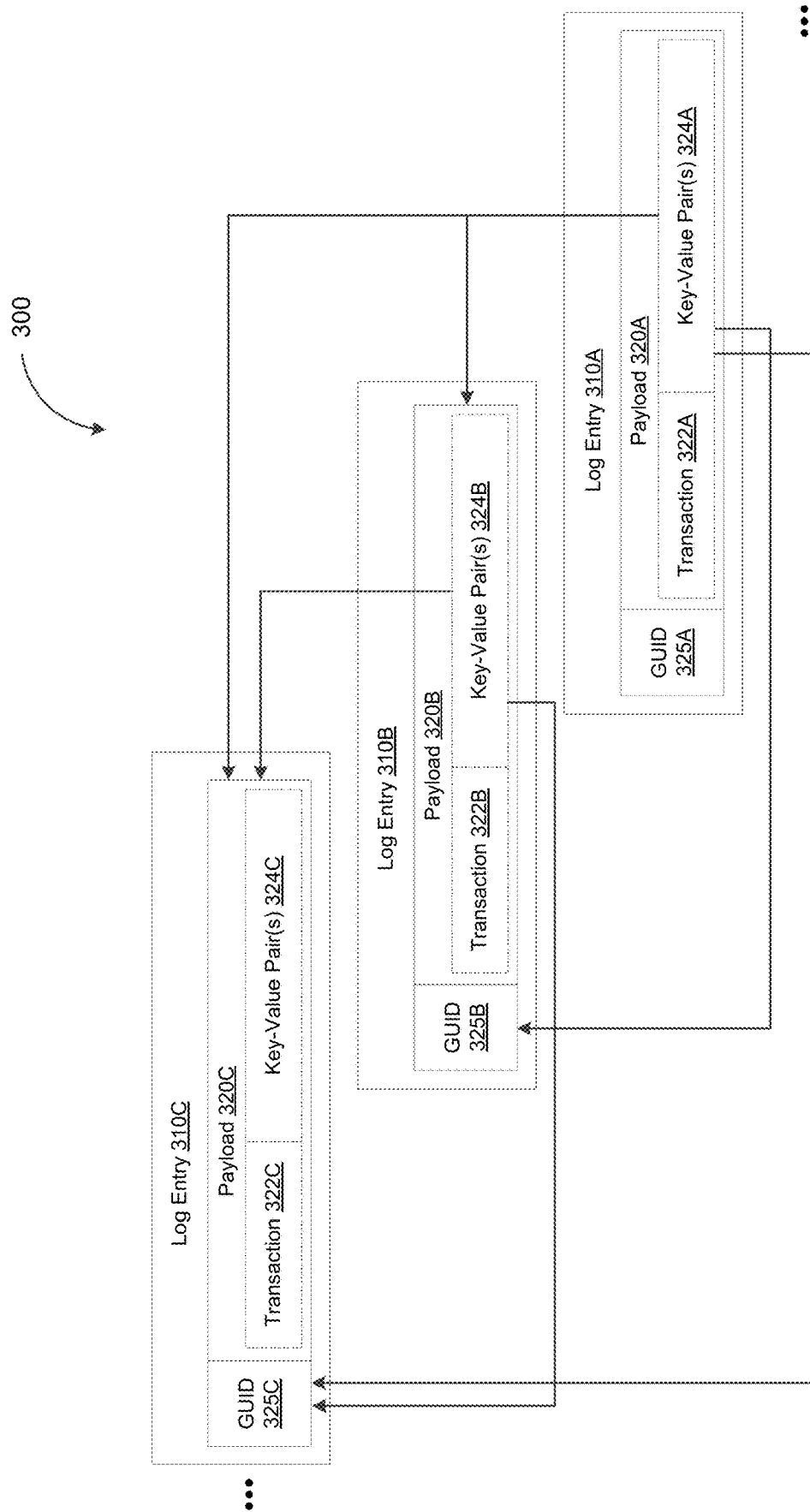
FIG. 3 depicts a portion of a mesh of transactions interlinking multiple transaction logs consistent with some implementations of the current subject matter.

To further illustrate, FIG. 3 depicts a portion of a mesh of transactions 300 interlinking multiple transaction logs consistent with some implementations of the current subject matter. Referring to FIGS. 1-3, the first transaction log 115A can record transactions affecting at least the first data partition 170A while the second transaction log 115B can record transactions affecting at least the second data partition 170B. Since a single transaction can affect multiple data partitions, the respective transaction logs for these data partitions can be interlinked by the corresponding log entries. Such transactions can form a mesh of transactions that interlink multiple transaction logs. For example, a transaction can modify data records from the first data partition 170A and the second data partition 170B. As such, the first transaction log 115A and the second transaction log 115B can at least be interlinked by the corresponding log entry of the transaction affecting both the first data partition 170A and the second data partition 170B.

As shown in FIG. 3, the basis for the mesh of transactions 300 can include plurality of log entries including, for example, a first log entry 310A, a second log entry 310B, and/or a third log entry 310C. Each of the first log entry 310A, the second log entry 310B, and the third log entry 310C can correspond to a transaction. For example, the first log entry 310A can correspond to a first transaction 322A, the second log entry 310B can correspond to a second transaction 322B, and the third log entry 310C can correspond to a third transaction 322C. Each of the first transaction 322A, the second transaction 322B, and/or the third transaction 322C can affect at least one data partition, for example, by modifying data records from that data partition. As such, the transaction logs of the data partitions affected by the first transaction 322A, the second transaction 322B, and/or the third transaction 322C can include log entries corresponding to the first transaction 322A, the second transaction 322B, and/or the third transaction 322C. For instance, the first transaction 322A, the second transaction 322B, and/or the third transaction 322C can each modify data records from one or more data partitions including, for example, the first data partition 170A, the second data partition 170B, and/or the like. Accordingly, the first transaction log 115A and the second transaction log 115B can each include the first log entry 310A corresponding to the first transaction 322A, the second log entry 310B corresponding to the second transaction 322B, and/or the third log entry 310C corresponding to the third transaction 322C.

According to some implementations of the current subject matter, each transaction that is executed at the distributed trust data storage system 100 can be associated with a globally unique identifier (GUID) that enables a differentiation between different transactions. For example, as shown in FIG. 3, the first transaction 322A can be associated with a first globally unique identifier 325A, the second transaction 322B can be associated with a second globally unique identifier 325B, and the third transaction 322C can be associated with a third globally unique identifier 325C. Furthermore, each transaction can have a payload that includes, for example, the transaction itself and one or more key-value pairs identifying previous transactions modifying the same data records. For instance, FIG. 3 shows the first transaction 322A having a first payload 320A, the second transaction 322B having a second payload 320B, and/or the third transaction 322C having a third payload 320C.

As noted, replicas of the first data partition 170A can be stored at each of a k quantity of distributed data storage systems including, for example, the first distributed data storage system 110A and the second distributed data storage system 110B. Meanwhile, replicas of the second data partition 170B can be stored at another k quantity of distributed data storage systems including, for example, the third distributed data storage system 110C. Accordingly, in some implementations of the current subject matter, the first log entry 310A corresponding to the first transaction 322A, the second log entry 310B corresponding to the second transaction 322B, and/or the third log entry 310C corresponding to the third transaction 322C can each be propagated, in accordance with a consensus protocol, to each of the distributed data storage systems storing replicas of the data partitions (e.g., the first data partition 170A, the second data partition 170B, and/or the like) affected by the first transaction 322A, the second transaction 322B, and/or the third transaction 322C.

For example, a node of the first distributed data storage system 110A can act as a leader node in the consensus protocol while a node of the second distributed data storage system 110B and/or the third distributed data storage system 110C can each act as a follower node in the consensus protocol. As such, the first distributed data storage system 110A can receive, from the client 130, a request to execute the first transaction 322A, the second transaction 322B, and/or the third transaction 322C. Furthermore, the first distributed data storage system 110A can determine whether the first transaction 322A, the second transaction 322B, and/or the third transaction 322C should be committed, for example, by being added to the first transaction log 115A and/or the second transaction log 115B stored at each of the distributed data storage systems storing replicas of the first data partition 170A and/or the second data partition 170B including, for example, the first distributed data storage system 110A, the second distributed data storage system 110B, and/or the third distributed data storage system 110C. For instance, the first distributed data storage system 110A can determine that the first transaction 322A, the second transaction 322B, and/or the third transaction 322C should be committed if a threshold quantity (e.g., $$\frac{k}{2}$$

or a different quantity) of the k quantity of distributed data storage systems storing replicas of the data partitions affected by the transactions (e.g., the first data partition 170A, the second data partition 170B, and/or the like) can determine a same cryptographic hash for each operation.

As noted, a transaction that affects multiple data partitions, for example, by modifying data records from multiple data partitions, can appear in the transaction logs of multiple data partitions. Moreover, the log entry for the transaction can further include a cryptographic hash of previous transactions that affect the same data records. For example, the first transaction 322A, the second transaction 322B, and/or the third transaction 322C can modify data records from at least the first data partition 170A and the second data partition 170B. Accordingly, the first log entry 310A corresponding to the first transaction 322A, the second log entry 310B corresponding to the second transaction 322B, and/or the third log entry 310C corresponding to the third transaction 322C can appear in the first transaction log 115A associated with the first data partition 170A as well as the second transaction log 115B associated with the second data partition 170B, thereby interlinking the first transaction log 115A and the second transaction log 115B. The first transaction log 115A and the second transaction log 115B can be further interlinked by the cryptographic hashes of previous transactions that are included in each of the first log entry 310A, the second log entry 310B, and/or the third log entry 310C because the first transaction log 115A and/or the second transaction log 115B can further include log entries corresponding to these previous transactions.

In some implementations of the current subject matter, modifying any individual transaction log (e.g., the first transaction log 115A, the second transaction log 115B, and/or the like) by changing any one of the first log entry 310A, the second log entry 310B, and/or the third log entry 310C can require a computation of the cryptographic hashes of all subsequent transactions recorded in the mesh of transactions 300, which may interlink the first transaction log 115A and the second transaction log 115B. This computation can require a prohibitively large quantity of computational resources. As such, the log entries included in the first transaction log 115A and/or the second transaction log 115B including, for example, the first log entry 310A, the second log entry 310B, and/or the third log entry 310C can be immune to modification including, for example, via malicious attacks.

As noted, in some implementations of the current subject matter, the payload of transaction modifying data records from at least one data partition (e.g., the first data partition 170A, the second data partition 170B, and/or the like) can include one or more key-value pairs. The key of each key-value pair can correspond to a globally unique identifier (GUID) of a previous transaction modifying the same data records while the value of each key-value pair can correspond to a cryptographic hash of a log entry for the transaction associated with that globally unique identifier (GUID). For example, the first payload 320A of the first log entry 310A can include first key-value pairs 324A. The keys of the first key-value pairs 324A can correspond to the second globally unique identifier 325B of the second transaction 322B corresponding to the second log entry 310B and/or the third globally unique identifier 325C of the third transaction 322C corresponding to the third log entry 310C. Alternatively and/or additionally, the values of the first key-value pairs 324A can correspond to cryptographic hashes of the second log entry 310B for the second transaction 322B associated with the second globally unique identifier 325B and/or the third log entry 310C for the third transaction 322C associated with the third globally unique identifier 325C.

Referring again to FIG. 3, a cryptographic hash for the first transaction 322A can be determined based on the first transactions 322A as well as a cryptographic hash of one or more previous transactions modifying the same data records as the first transaction 322A including, for example, the second transaction 322B corresponding to the second log entry 310B, the third transaction 322C corresponding to the third log entry 310C, and/or the like. It should be appreciated that any hash function can be used to generate the cryptographic hash of the first transaction 322A and/or the cryptographic hash of the previous transactions including for example, MD5, SHA1, SHA2, and/or the like. In some implementations of the current subject matter, the first log entry 310A corresponding to the first transaction 322A can be added to the first transaction log 115A and/or the second transaction log 115B if a threshold quantity (e.g., $$\frac{k}{2}$$

or a different quantity) of the distributed data storage systems storing replicas of the data partitions affected by the first transaction 322A (e.g., the first data partition 170A, the second data partition 170B, and/or the like) are able to determine a same cryptographic hash for the first transaction 322A.

For example, a node of the first distributed data storage system 110A, in its capacity as the leader node in the consensus protocol, can distribute the first log entry 310A corresponding to the first transaction 322A to follower nodes participating in the consensus protocol including, for example, a node of the second distributed data storage system 110B and/or the third distributed data storage system 110C. As shown in FIG. 3, the first log entry 310A can include the first globally unique identifier (GUID) 325A of the first transaction 322A as well as the first payload 320A. As noted, the first payload 320A can include the first transaction 322A itself and one or more key-value pairs 324A identifying previous transactions that modified the same data records as the first transaction 322A (e.g., the second transaction 322B, the third transaction 322C, and/or the like). Each follower node (e.g., the second distributed data storage system 110B, the third distributed data storage system 110C, and/or the like) can compute a cryptographic hash of the first transaction 322A based on the first transaction 322A. Furthermore, each follower node can compute a cryptographic hash of one or more previous transactions modifying the same data records as the first transaction 322A. The one or more previous transactions can be determined independently by each of the follower nodes, for example, by traversing the transaction logs (e.g., the first transaction log 115A, the second transaction log 115B, and/or the like) stored at each distributed data storage system within the distributed trust data storage system 100 because, as noted, the transaction logs can be interlinked by the mesh of transactions 300 stored across the transaction logs.

The cryptographic hashes determined by the follower nodes can be returned to a leader node of the first distributed data storage system 110A which, in its capacity as the leader node, can determine whether a threshold quantity (e.g., $$\frac{k}{2}$$

or a different quantity) of the follower nodes (e.g., one or more nodes of the second distribute data storage system 110B, the third distributed data storage system 110C, and/or the like) are able to reach a consensus by at least determining a same cryptographic hash. If a consensus was reached by a threshold quantity (e.g., $$\frac{k}{2}$$

or a different quantity) or rollover nodes, the first distributed data storage system 110A can commit the first transaction 322A by at least adding the corresponding first log entry 310A to the replica of the first transaction log 115A and/or the second transaction log 115B stored at the first distributed data storage system 110A. Furthermore, the first distributed data storage system 110A can commit the first transaction 322A by at least sending, to the second distributed data storage system 110B and/or the third distributed data storage system 110C, an indication to add the first log entry 310A to the replicas of the first transaction log 115A and/or the second transaction log 115B stored at the second distributed data storage system 110B and/or the third distributed data storage system 110C.

Similarly, a cryptographic hash of the second transaction 322B can be determined based on the second transaction 322B as well as a cryptographic hash of one or more previous transactions modifying the same data records as the second transaction 322B including, for example, the third transaction 322C. In some implementations of the current subject matter, the second log entry 310B can be added to the replica of the first transaction log 115A and/or the second transaction log 115B if the first distributed data storage system 110A, in its capacity as the leader node of the consensus protocol, determines that a threshold quantity (e.g., $$\frac{k}{2}$$

or a different quantity) of follower nodes storing the data partitions affected by the second transaction 322B (e.g., the first data partition 170A, the second data partition 170B, and/or the like) are able to reach a consensus by at least determining a same cryptographic hash for the second transaction 322B.

The client 130 can request to perform an operation to read data stored in the distributed trust data storage system 100 including, for example, data records that are part of the first data partition 170A and/or the second data partition 170B. In some implementations of the current subject matter, the operation to read data from the first data partition 170A and/or the second data partition 170B can be performed by at least determining a current state of at least a portion of the first data partition 170A and/or the second data partition 170B as well as a history of changes to those portions of the first data partition 170A and/or the second data partition 170B. The current state of the first data partition 170A and/or the second data partition 170B as well as the history of changes to the portion of the first data partition 170A and/or the second data partition 170B can be determined by querying the first transaction log 115A and/or the second transaction log 115B. As noted, replicas of the first transaction log 115A and/or the second transaction log 115 can be stored across the distributed trust data storage system 100 including, for example, at the first distributed data storage system 110A, the second distributed data storage system 110B, the third distributed data storage system 110C, and/or the like. The first transaction log 115A and the second transaction log 115B can be interlinked by at least storing a mesh of transactions (e.g., the mesh of transactions 300). Thus, querying the first transaction log 110A and the second transaction log 110B can include traversing the first transaction log 110A and the second transaction log 110B in order to retrieve a sequence of transactions corresponding to the first log entry 310A, the second log entry 310B, and/or the third log entry 310C.

According to some implementations of the current subject matter, the operation to read data from the first data partition 170A and/or the second data partition 170B can be performed by querying one or more of the distributed data storage systems in the meshed storage system 100 storing the replicas of first data partition 170A and/or the second data partition 170B including, for example, the replicas of the corresponding first transaction log 115A and the second transaction log 115B. For instance, the client 130 can query at least a $$\frac{k}{2}$$

quantity of the distributed data storage systems in order to retrieve, from each of the $$\frac{k}{2}$$

quantity of distributed data storage systems, one or more of the first log entry 310A, the second log entry 310B, and/or the third log entry record 310C. Furthermore, the client 130 can verify the results received from each of the $$\frac{k}{2}$$

quantity of distributed data storage systems. Any discrepancy in the results received from the $$\frac{k}{2}$$

quantity of distributed data storage systems can indicate a presence of a forged transaction. These discrepancies can include a mismatch in the results received from two or more or the $$\frac{k}{2}$$

quantity of distributed data storage systems.

In response to a discrepancy in the results received from two or more distributed data storage systems, the client 130 may query the remaining distributed data storage systems in the distributed trust data storage system 100 that are storing replicas of the first data partition 170A and/or the second data partition 170B. If a quorum can be found, for example, with more than $$\frac{k}{2}$$

of the remaining distributed data storage systems agreeing on a same value, then this value can be used as the corrected result of the read operation. Thus, in order to successfully forge a transaction, an attacker must be able to propagate the forged transaction to at least a quorum of distributed data storage system storing replicas of the corresponding data partition.

To further illustrate, refer again to FIG. 3, which shows that the payload of a transaction included in each log entry can include one or more key-value pairs. As noted, the key in each of these key-value pairs can correspond to a globally unique identifier of a previous transaction while the value in each of these key-value pairs can correspond to cryptographic hashes of the log entries for the transactions associated with these globally unique identifiers. For example, the first payload 320A of the first transaction 322A can include first key-value pairs 324A. The keys of the first key-value pairs 324A can correspond to the second globally unique identifier 325B of the second transaction 322B and/or the third globally unique identifier 325C of the third transaction 322C. Alternatively and/or additionally, the values of the first key-value pairs 324A can correspond to cryptographic hashes of the second log entry 310B for the second transaction 322B associated with the second globally unique identifier 325B and/or the third log entry 310C for the third transaction 322C associated with the third globally unique identifier 325C.

In some implementations of the current subject matter, the client 130 can verify the results received from the $$\frac{k}{2}$$

quanitity of distributed data storage systems based on the first key-value pairs 324A from the first payload 320A of the first transaction 322A, the second key-value pairs 324B from the second payload 320B of the second transaction 322B, and/or the third key-value pairs 324C from the third payload 320C of the third transaction 322C. For instance, the client 130 can determine that the first transaction 322A and/or the second transaction 322B are forged based at least on a mismatch between the value stored in the first key-value pairs 324A and a cryptographic hash of the second log entry 310B for the second transaction 322B associated with the second globally unique identifier 325B. Alternatively and/or additionally, the client 130 can determine that the second transaction 322B and/or the third transaction 322C are forged based at least on a mismatch between the value of second key-value pairs 324B and the a cryptographic hash of the third log entry 310C for the third transaction 322C associated with the third globally unique identifier 325C.

Figure 4A:
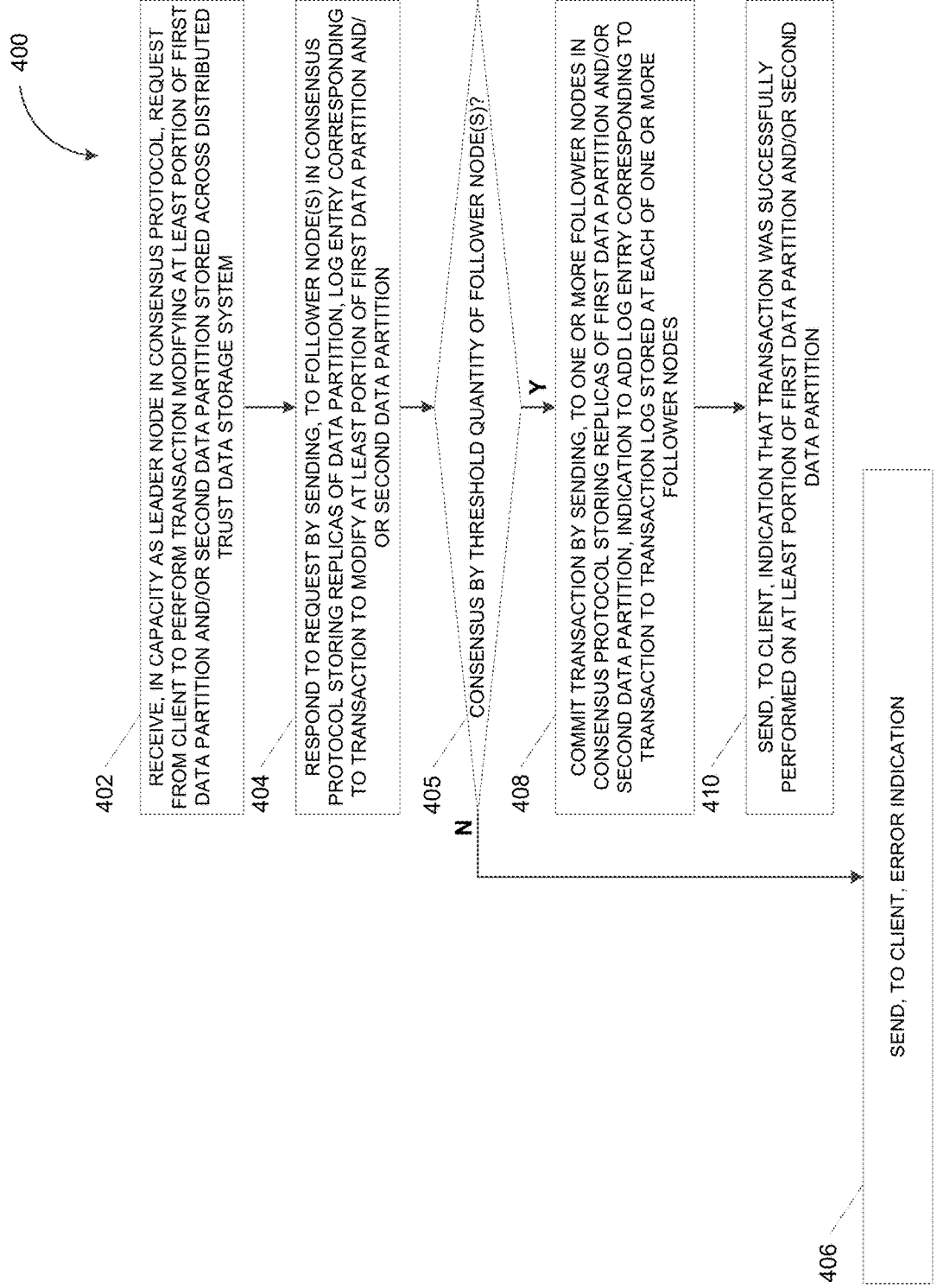
FIG. 4A depicts a flowchart illustrating a process for performing an operation to modify a data partition stored in a distributed data storage system consistent with some implementations of the current subject matter.

FIG. 4A depicts a flowchart illustrating a process 400 for executing a transaction in a distributed trust data storage system consistent with some implementations of the current subject matter. Referring to FIGS. 1-2, 3A-B, and 4A, the process 400 can be performed by the distributed trust data storage system 100, for example, the first distributed data storage system 110A (or another distributed data storage system) to modify at least a portion of the first data partition 170A and/or the second data partition 170B. As noted, replicas of the first data partition 170A and/or the second data partition 170B can be stored across the distributed trust data storage system 100, for example, at a k quantity of distributed data storage systems including, for example, the first distributed data storage system 110A, the second distributed data storage system 110B, and/or the third distributed data storage system 110C. In particular, while a single distributed data storage system can store replicas of multiple data partitions, multiple replicas of a single data partitions may not be stored at a single distributed data storage system. Accordingly, in some implementations of the current subject matter, the process 400 can be performed in order to propagate, in accordance to a consensus protocol, the transaction to the k quantity of distributed data storage systems storing replicas of the first data partition 170A and/or the second data partition 170B affected by the transaction.

The first distributed data storage system 110A can receive, in its capacity as the leader node in the consensus protocol, a request from the client 130 to execute a transaction modifying at least a portion of the first data partition 170A and/or the second data partition 170B stored across the distributed trust data storage system 100 (402). For example, in some implementations of the current subject matter, a request from the client 130 to execute a transaction modifying at least a portion of first data partition 170A and/or the second data partition 170B can be routed to the first distributed data storage system 110A (or another distributed data storage system) acting as the leader node in a consensus protocol.

The first distributed data storage system 110A can respond to the request by sending, to one or more follower nodes in the consensus protocol storing replicas of the first data partition 170A and/or the second data partition 170B, a log entry corresponding to the transaction to modify at least the portion of the first data partition 170A and/or the second data partition 170B (404). For example, the first distributed data storage system 110A can send the first log entry 310A corresponding to the first transaction 322A to one or more follower nodes participating in the consensus protocol including, for example, the second distributed data storage system 110B and/or the third distributed data storage system 110C. It should be appreciated that the first distributed data storage system 110A can identify, based on a topology of the distributed trust data storage system 100 stored at a topology manager, the second distributed data storage system 110B and/or the third distributed data storage system 110C as storing replicas of the first data partition 170A and/or the second data partition 170B.

The first distributed data storage system 110A can determine whether a threshold quantity of the one or more follower nodes reached a consensus by at least determining the same cryptographic hash for the transaction (405). In some implementations of the current subject matter, the cryptographic hash for a transaction can be determined based on the transaction as well as the cryptographic hashes of one or more previous transactions that modified the same data records. For instance, as shown in FIG. 3, the cryptographic hash for the first transaction 322A can be determined based on the first transaction 322A as well as the second log entry 310B (e.g., the second payload 320B) corresponding to the second transaction 322B and/or the third log entry 310C (e.g., the third payload 320C) corresponding to the third transaction 322C. It should be appreciated that the second log entry 310B and/or the third log entry 310C can be part of a mesh of transactions (e.g., the mesh of transactions 300) interlinking multiple transaction logs such as, for example, the first transaction log 115A, the second transaction log 115B, and/or the like. As such, each of the second distributed data storage system 110B and/or the third distributed data storage system 110C can determine a cryptographic hash for the first transaction 322A based on the first transaction 322A and one or more previous transactions (e.g., the second transaction 322B corresponding to the second log entry 310B, the third transaction 322C corresponding to the third log entry 310C, and/or the like). As noted, the one or more previous transactions can be identified by at least traversing the mesh of transactions 300 interlinking the first transaction log 115A, the second transaction log 115B, and/or the like. Moreover, the first transaction 322A can be verified if a threshold quantity (e.g., $$\frac{k}{2}$$

or a different quantity) of the k quantity of distributed data storage systems storing replicas of the first data partition 170A and/or the second data partition 170B can reach a consensus by determining a same cryptographic hash for the first transaction 322A.

If the first distributed data storage system 110A determines that a threshold quantity of the one or more follower nodes did not reach a consensus by determining a same cryptographic hash for the transaction (405-N), the first distributed data storage system 110A can send an error indication to the client 130 (406). For example, the first distributed data storage system 110A can determine that the transaction requested by the client 130 has failed if fewer than the threshold quantity (e.g., $$\frac{k}{2}$$

or a different quantity) of the k quantity of distributed data storage systems storing replicas of the first data partition 170A and/or the second data partition 170B determined a same cryptographic hash for the first transaction 322A. It should be appreciated that the threshold quantity (e.g., $$\frac{k}{2}$$

or a different quantity) can include and/or exclude the first distributed data storage system 110A which, as noted, can be acting as the leader node in the consensus protocol.

Alternatively and/or additionally, the first distributed data storage system 110A can determine that a threshold quantity of the one or more follower nodes did reach a consensus by determining a same cryptographic hash for the transaction (405-Y). As such, the first distributed data storage system 110A can commit the transaction by at least sending, to the one or more follower nodes in the consensus protocol storing replicas of the first data partition 170A and/or the second data partition 170B, an indication to add a log entry corresponding to the transaction to a transaction log stored at each of the one or more follower nodes (408). Furthermore, the first distributed data storage system 110A can send, to the client 130, an indication that the transaction was successfully performed on at least the portion of the first data partition 170A and/or the second data partition 170B (410). For example, if the threshold quantity (e.g., $$\frac{k}{2}$$

or a different quantity) of the k quantity of distributed data storage systems storing replicas of the first data partition 170A and/or the second data partition 170B are able to determine a same cryptographic hash for the first transaction 322A, the first transaction 322A can be committed by at least adding, to the first transaction log 115A and/or the second transaction log 115B, the corresponding first log entry 310A. Accordingly, the first distributed data storage system 110A, as the leader node in the consensus protocol, can send, to the follower nodes participating in the consensus protocol, an indication to add the first log entry 310A to the replicas of the first transaction log 115A and/or the second transaction log 115B stored at each of the follower nodes including, for example, the second distributed data storage system 110B and/or the third distributed data storage system 110C. As noted, the first transaction log 115A and the second transaction log 115B can be interlinked by the mesh of transactions 300, which includes an entire sequence of transactions modifying the first data partition 170A and/or the second data partition 170B, up to the first transaction 322A corresponding to the first log entry 310A. This sequence of transactions can be immutable due to the prohibitively large quantity of computing resources required to modify any of the log entries in any of the transaction logs (e.g., the first transaction log 115A, the second transaction log 115B, and/or the like) interlinked by the mesh of transactions 300. For instance, to change any one of the first log entry 310A, the second log entry 310B, and/or the third log entry 310C in the first transaction log 115A and/or the second transaction log 115B can require a computation of the cryptographic hashes of all subsequent transactions recorded in every transaction log that is interlinked by the mesh of transactions including, for example, the first transaction log 115A, the second transaction log 115B, and/or the like.

Figure 4B:
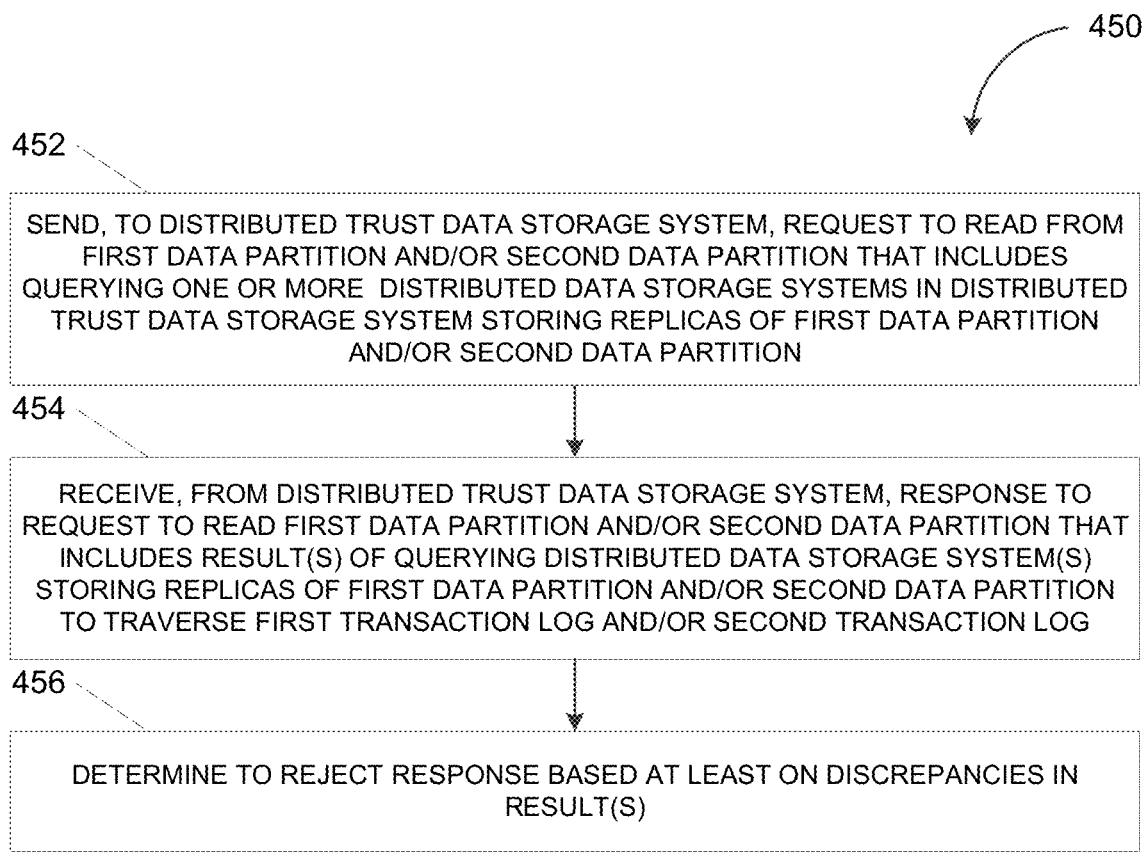
FIG. 4B depicts a flowchart illustrating a process for performing an operation to read a data partition stored in a distributed data storage system consistent with some implementations of the current subject matter.

FIG. 4B depicts a flowchart illustrating a process 450 for performing an operation to read a data partition stored in a distributed trust data storage system consistent with some implementations of the current subject matter. Referring to FIGS. 1-2, 3A-B, and 4B, the process 450 can be performed by the client 130 to read at least a portion of the first data partition 170A and/or the second data partition 170B stored across the distributed trust data storage system 100. As noted, replicas of the first data partition 170A and/or the second data partition 170B can be stored at different distributed data storage systems within the distributed trust data storage system 100 such as, for example, at a k quantity of distributed data storage systems that includes the first distributed data storage system 110A, the second distributed data storage system 110B, and/or the third distributed data storage system 110C. Accordingly, in some implementations of the current subject matter, the process 450 can be performed in order for the client 130 to verify the responses from one or more of the k quantity of distributed data storage systems storing replicas of the first data partition 170A and/or the second data partition 170B.

The client 130 can send, to the distributed trust data storage system 100, a request to read the first data partition 170A and/or the second data partition 170B that includes querying one or more distributed data storage systems within the distributed trust data storage system 100 that are storing replicas of the first data partition 170A and/or the second data partition 170B (452). For example, in some implementations of the current subject matter, the client 130 can send, to the distributed trust data storage system 100, a request to read the first data partition 170A and/or the second data partition 170B. Reading the first data partition 170A and/or the second data partition 170B can require determining a latest state of one or more portions of the first data partition 170A and/or the second data partition 170B as well as a history of changes to these portions of the first data partition 170A and/or the second data partition 170B. As noted, the latest state of a portion of the first data partition 170 and/or the second data partition 170B as well as the history of the changes to that portion of the first data partition 170A and/or the second data partition 170B can be determined by at least querying, for example, the first transaction log 115A and/or the second transaction log 115B recording the transactions that modified the first data partition 170A and/or the second data partition 170B. According to some implementations of the current subject matter, the request to read the first data partition 170A and/or the second data partition 170B can require querying each of the one or more of the k quantity of distributed data storage systems storing replicas of the first data partition 170A and/or the second data partition 170B. For example, the request to read the first data partition 170A and/or the second data partition 170B can require querying at least a $$\frac{k}{2}$$

quantity of the k quantity or distributed data storage systems in order to retrieve, from each of the $$\frac{k}{2}$$

quantity of distributed data storage systems, one or more of the first log entry 310A, the second log entry 310B, and/or the third log entry 310C from the replica of first transaction log 115A and/or the second transaction log 115B stored at each of the $$\frac{k}{2}$$

quantity of distributed data storage systems.

The client 130 can receive, from the distributed trust data storage system 100, a response to the request to read the data partition 170 that includes one or more results from querying the one or more distributed data storage systems storing replicas of the first data partition 170A and/or the second data partition 170B to at least traverse the first transaction log 115A and/or the second transaction log 115B (454). For example, in some implementations of the current subject matter, the client 130 can receive multiple results from each of the $$\frac{k}{2}$$

quantity of distributed data storage systems that includes, for example, one or more of the first log entry 310A, the second log entry 310B, and/or the third log entry 310B from the replicas of the first transaction log 115A and/or the second transaction log 115B stored at each of the $$\frac{k}{2}$$

quantity of distributed data storage systems.

The client 130 can determine to reject the response based at least on one or more discrepancies in the one or more results (456). In some implementations of the current subject matter, the client 130 can verify the results received from each of the $$\frac{k}{2}$$

quantity of distributed data storage systems. The client 130 can further reject the response to the request to read the first data partition 170A and/or the second data partition 170B if one or more discrepancies are present in the results received from the $$\frac{k}{2}$$

quantity of distributed data storage systems. As noted, discrepancies in the results received from the $$\frac{k}{2}$$

quantity or distributed data storage systems can indicate a presence of at least one forged transaction. A discrepancy can include, for example, a mismatch in the results received from two or more of the $$\frac{k}{2}$$

quantity or distributed data storage systems and/or a lack of continuity between two or more log entries in the results. For instance, the client 130 can determine that the first transaction 322A and/or the second transaction 322B are forged based at least on a mismatch between the value of first key-value pairs 324A and the cryptographic hash of the second log entry 310B for the second transaction 322B referenced by the second globally unique identifier 325B. Alternatively and/or additionally, the client 130 can determine that the second transaction 322B and/or the third transaction 322C are forged based at least on a mismatch between the value of second key-value pairs 324B and the cryptographic hash of the third log entry 310C for the third transaction 310C referenced by the third globally unique identifier 325C.

Figure 5:
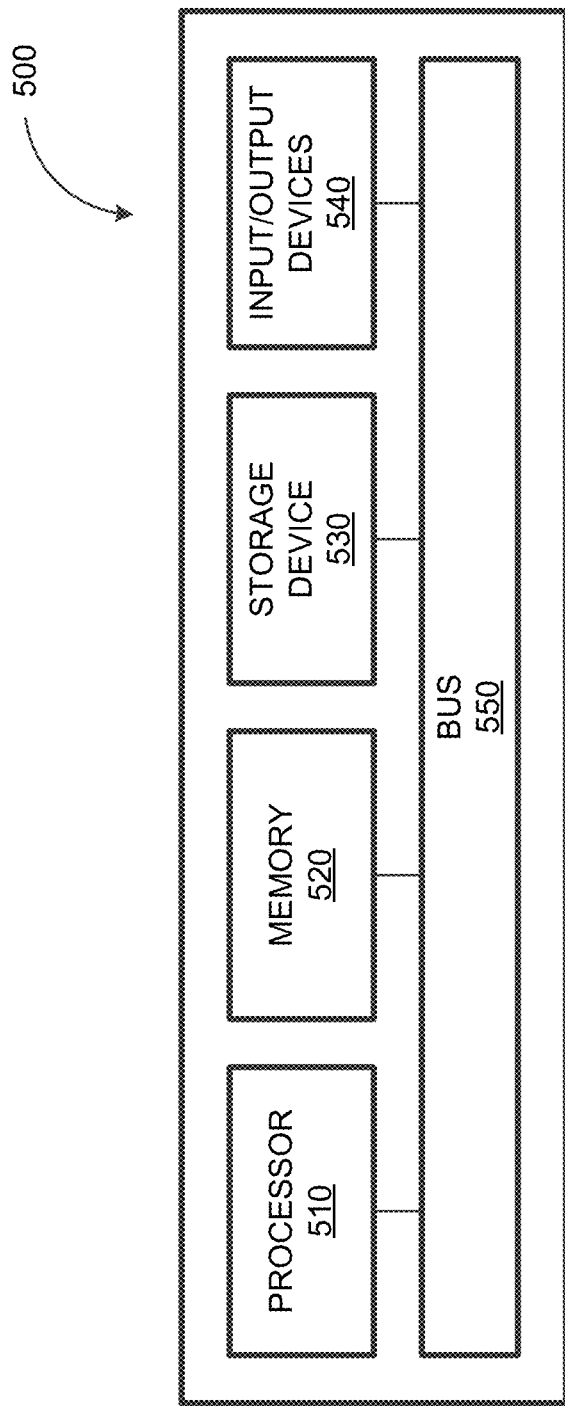
FIG. 5 depicts a block diagram illustrating a computing system consistent with some implementations of the current subject matter.

FIG. 5 depicts a block diagram illustrating a computing system 500 consistent with implementations of the current subject matter. Referring to FIGS. 1 and 5, the computing system 500 can be used to implement the distributed trust data storage system 100 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, distributed trust data storage system 100. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
      receiving, at a leader node included in a distributed trust data storage system, a request from a client to execute a first transaction modifying at least a first portion of a first data partition and a second portion of a second data partition, replicas of the first data partition and the second data partition being stored at a plurality of follower nodes included in the distributed trust data storage system;
      responding to the request by at least sending, to the plurality of follower nodes storing replicas of the first data partition and the second data partition, the first transaction to modify at least the first portion of the first data partition and the second portion of the second data partition;
      receiving, from each of the plurality of follower nodes, a first cryptographic hash for the first transaction, the first cryptographic hash being computed based at least on the first transaction and one or more previous transactions executed at each of the plurality of follower nodes, the one or more previous transactions modifying a same data record at the first data partition or the second data partition as the first transaction; and in response to each follower node of at least a threshold quantity of the plurality of follower nodes determining an identical cryptographic hash for the first transaction, committing the first transaction by at least sending an indication to add, to a first transaction log associated with the first data partition and a second transaction log associated with the second data partition, a first entry corresponding to the first transaction, the indication being sent to a first node storing replicas of the first data partition and the first transaction log, the indication further being sent to a second node storing replicas of the second data partition and the second transaction log, the addition of the first entry interlinking the first transaction log and the second transaction log to form a mesh of cross-linked transactions stored across multiple transaction logs in the distributed trust data storage system.

2. The system of claim 1, wherein the first entry corresponding to the first transaction includes a globally unique identifier associated with the first transaction and a second cryptographic hash associated with the one or more previous transactions.

3. The system of claim 1, wherein the first transaction log and/or the second transaction log further include a second entry corresponding to a second transaction modifying the same data record as the first transaction, and wherein the second entry includes a globally unique identifier associated with the second transaction and a second cryptographic hash of at least a third transaction preceding the second transaction and modifying the same data record as the second transaction.

4. The system of claim 1, wherein at least one of the plurality of follower nodes stores a replica of the first data partition and a replica of the second data partition, and wherein none of the plurality of follower nodes store more than one replica of a same data partition.

5. The system of claim 1, further comprising:
responding, by the leader node, to another request from the client to read the first data partition by querying at least a portion of the plurality of follower nodes storing the first data partition, the portion of the plurality of follower nodes being queried to at least retrieve one or more entries from the transaction log recording the one or more previous transactions executed on at least the portion of the first data partition.

6. The system of claim 5, wherein the one or more entries retrieved from the plurality of follower nodes are returned to the client to at least enable a detection of a forged transaction, and wherein the forged transaction is detected based at least on a mismatch between an entry retrieved from the first node storing a first replica of the first data partition and another entry retrieved from a third node storing a second replica of the first data partition.

7. The system of claim 6, further comprising:
in response to detecting the forged transaction, querying a remaining portion of the plurality of follower nodes storing the first data partition to at least retrieve the one or more entries from the transaction log recording the one or more transactions executed on at least the portion of the first data partition; and
in response to a match in the one or more entries of the transaction log retrieved from a quorum of the remaining portion of the plurality of follower nodes, responding to the other request based on the one or more entries of the transaction log retrieved from the remaining portion of the plurality of follower nodes.

8. The system of claim 6, wherein the one or more entries retrieved from the plurality of follower nodes include the first entry corresponding to the first transaction and a third entry corresponding to a second transaction preceding the first transaction, wherein the forged transaction is further detected based at least on a mismatch in a hash value of the second transaction stored in a key-value pair associated with the first transaction and an actual hash of the second transaction, wherein a key of the key-value pair comprises the globally unique identifier of the second transaction, and wherein a value of the key-value pair comprises a cryptographic hash of at least a portion of the second entry corresponding to the second transaction.

9. A computer-implemented method, comprising:
receiving, at a leader node included in a distributed trust data storage system, a request from a client to execute a first transaction modifying at least a first portion of a first data partition and a second portion of a second data partition, replicas of the first data partition and the second data partition being stored at a plurality of follower nodes included in the distributed trust data storage system;
responding to the request by at least sending, to the plurality of follower nodes storing replicas of the first data partition and the second data partition, the first transaction to modify at least the first portion of the first data partition and the second portion of the second data partition;
receiving, from each of the plurality of follower nodes, a first cryptographic hash for the first transaction, the first cryptographic hash being computed based at least on the first transaction and one or more previous transactions executed at each of the plurality of follower nodes, the one or more previous transactions modifying a same data record at the first data partition or the second data partition as the first transaction; and
in response to each follower node of at least a threshold quantity of the plurality of follower nodes determining an identical cryptographic hash for the first transaction, committing the first transaction by at least sending an indication to add, to a first transaction log associated with the first data partition and a second transaction log associated with the second data partition, a first entry corresponding to the first transaction, the indication being sent to a first node storing replicas of the first data partition and the first transaction log, the indication further being sent to a second node storing replicas of the second data partition and the second transaction log, the addition of the first entry interlinking the first transaction log and the second transaction log to form a mesh of cross-linked transactions stored across multiple transaction logs in the distributed trust data storage system.

10. The method of claim 9, wherein the first entry corresponding to the first transaction includes a first globally unique identifier associated with the first transaction and a second cryptographic hash of a second transaction modifying the same data record, wherein the first transaction log and/or the second transaction log further include a second entry corresponding to the second transaction, and wherein the second entry includes a second globally unique identifier associated with the second transaction and a third cryptographic hash of at least a third transaction modifying the same data record.

11. The method of claim 9, wherein at least one of the plurality of follower nodes stores a replica of the first data partition and a replica of the second data partition, and wherein none of the plurality of follower nodes store more than one replica of a same data partition.

12. The method of claim 9, further comprising:
responding, by the leader node, to another request from the client to read the first data partition by querying at least a portion of the plurality of follower nodes storing the first data partition, the portion of the plurality of follower nodes being queried to at least retrieve one or more entries from the transaction log recording the one or more previous transactions executed on at least the portion of the first data partition;
detecting a forged transaction based at least on a mismatch between an entry retrieved from the first node storing a first replica of the first data partition and another entry retrieved from a third node storing a second replica of the first data partition;
in response to detecting the forged transaction, querying a remaining portion of the plurality of follower nodes storing the first data partition to at least retrieve the one or more entries from the transaction log recording the one or more transactions executed on at least the portion of the first data partition; and
in response to a match in the one or more entries of the transaction log retrieved from a quorum of the remaining portion of the plurality of follower nodes, responding to the other request based on the one or more entries of the transaction log retrieved from the remaining portion of the plurality of follower nodes.

13. The method of claim 12, wherein the one or more entries retrieved from the plurality of follower nodes include the first entry corresponding to the first transaction and a third entry corresponding to a second transaction preceding the first transaction, wherein the forged transaction is further detected based at least on a mismatch in a hash value of the second transaction stored in a key-value pair associated with the first transaction and an actual hash of the second transaction, wherein a key of the key-value pair comprises the globally unique identifier of the second transaction, and wherein a value of the key-value pair comprises a cryptographic hash of at least a portion of the second entry corresponding to the second transaction.

14. A non-transitory computer readable medium storing instructions, which when executed by at least one data processor, result in operations comprising:
receiving, at a leader node included in a distributed trust data storage system, a request from a client to execute a first transaction modifying at least a first portion of a first data partition and a second portion of a second data partition, replicas of the first data partition and the second data partition being stored at a plurality of follower nodes included in the distributed trust data storage system;
responding to the request by at least sending, to the plurality of follower nodes storing replicas of the first data partition and the second data partition, the first transaction to modify at least the first portion of the first data partition and the second portion of the second data partition;
receiving, from each of the plurality of follower nodes, a first cryptographic hash for the first transaction, the first cryptographic hash being computed based at least on the first transaction and one or more previous transactions executed at each of the plurality of follower nodes, the one or more previous transactions modifying a same data record at the first data partition or the second data partition as the first transaction; and
in response to each follower node of at least a threshold quantity of the plurality of follower nodes determining an identical cryptographic hash for the first transaction, committing the first transaction by at least sending an indication to add, to a first transaction log associated with the first data partition and a second transaction log associated with the second data partition, a first entry corresponding to the first transaction, the indication being sent to a first node storing replicas of the first data partition and the first transaction log, the indication further being sent to a second node storing replicas of the second data partition and the second transaction log, the addition of the first entry interlinking the first transaction log and the second transaction log to form a mesh of cross-linked transactions stored across multiple transaction logs in the distributed trust data storage system.

* * * * *